(12) United States Patent
Abdo et al.

(10) Patent No.: US 8,127,036 B2
(45) Date of Patent: Feb. 28, 2012

(54) REMOTE SESSION MEDIA DATA FLOW AND PLAYBACK

(75) Inventors: Nadim Y. Abdo, Bellevue, WA (US); Vladimir K. Stoyanov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1256 days.

(21) Appl. No.: 11/428,238

(22) Filed: Jun. 30, 2006

(65) Prior Publication Data

US 2008/0005801 A1 Jan. 3, 2008

(51) Int. Cl.
G06F 15/16 (2006.01)

(52) U.S. Cl. ......................................................... 709/231

(58) Field of Classification Search .................. 709/231; 725/37–61, 86–134
See application file for complete search history.

(56) References Cited

U.S. PATENT DOCUMENTS

| | | | |
|---|---|---|---|
| 5,617,539 A | | 4/1997 | Ludwig et al. |
| 6,233,611 B1 | | 5/2001 | Ludtke et al. |
| 6,421,706 B1 | | 7/2002 | McNeill et al. |
| 6,466,585 B1 | | 10/2002 | Le |
| 6,675,387 B1 | * | 1/2004 | Boucher et al. ............... 725/105 |
| 6,760,749 B1 | | 7/2004 | Dunlap et al. |
| 7,287,099 B1 | * | 10/2007 | Powderly et al. .................. 710/7 |
| 7,876,978 B2 | * | 1/2011 | Berger et al. .................. 382/299 |
| 2001/0056474 A1 | | 12/2001 | Arai |
| 2003/0101294 A1 | * | 5/2003 | Saint-Hilaire et al. .......... 710/11 |
| 2003/0156568 A1 | | 8/2003 | Reich et al. |
| 2003/0162495 A1 | * | 8/2003 | Yonemoto et al. ................ 455/7 |
| 2004/0024812 A1 | | 2/2004 | Park et al. |
| 2005/0015815 A1 | * | 1/2005 | Shoff et al. .................... 725/135 |
| 2005/0091571 A1 | * | 4/2005 | Leichtling ...................... 715/500 |
| 2005/0232284 A1 | | 10/2005 | Karaoguz et al. |
| 2006/0010392 A1 | * | 1/2006 | Noel et al. ..................... 715/759 |
| 2006/0218611 A1 | * | 9/2006 | Son et al. ....................... 725/105 |
| 2006/0294125 A1 | * | 12/2006 | Deaven .......................... 707/101 |
| 2007/0115388 A1 | * | 5/2007 | Apelbaum ................. 348/430.1 |
| 2007/0174881 A1 | * | 7/2007 | Idehara et al. ................... 725/90 |

FOREIGN PATENT DOCUMENTS

| | | |
|---|---|---|
| WO | WO 98/23075 | 5/1998 |
| WO | WO 02/059799 A1 | 8/2002 |
| WO | WO 03/071759 A1 | 8/2003 |

OTHER PUBLICATIONS

Lead Technologies "Multimedia Conversion", 2 pages 2005 http://www.leadtools.com/SDK/MULTIMEDIA/Multimedia-Conversion.htm (PDF Attachment Article 1).

(Continued)

*Primary Examiner* — William C. Vaughn, Jr.
*Assistant Examiner* — Shirley Zhang
(74) *Attorney, Agent, or Firm* — Workman Nydegger

(57) ABSTRACT

In one embodiment of the present invention, a first computer system is capable of performing a method whereby the first computer system may provide a continuous media data flow to a second computer system. The method involves the first computer system accessing that is to be presented at a second computer system. The first computer system formulates metadata representing the location and boundaries of a media application window. The first computer system formulates windows presentation information representative of the configuration of other interface elements that are to be presented along with the media information at the second computer system. The first computing system transmits the windows presentation information to the second computer system. The first computing system transmits the metadata to the second computer system and separately transmits the media information to the second computer system.

24 Claims, 3 Drawing Sheets

OTHER PUBLICATIONS

Lead Technologies "LEADTOOLS Video Conferencing SDK", 3 pages 2005 http://www.leadtools.com/SDK/Multimedia/video-conferencing-sdk.htm (PDF Attachment Article 2).

KE Vitalware "Multimedia—Convert", 4 pages Jun. 24, 2003 http://vwdev.kesoftware.com/Registry/Multimedia/MultimediaConvert.html (PDF Attachment Article 3).

* cited by examiner

REMOTE SESSION MEDIA DATA FLOW AND PLAYBACK

BACKGROUND

Computers are ubiquitous in today's world. They are used by people of all ages to perform a variety of tasks. Computers usually carry out these tasks by executing a computer application. Computer applications can be used to facilitate everything from stock purchases to instant messaging, from business accounting to video games. One type of computer application used by both businesses and individuals is a remote session application. A remote session application allows a local computer user to log in to a remote computer and run applications provided by the remote computer on the user's local computer. One example of a remote session application is MICROSOFT™ Remote Desktop. Other examples include CITRIX™ Metaframe, and the open source "rdesktop".

Remote session applications typically run in the following manner: for example, a local computer user (client) may log in to a remote computer (server) to gain access to the applications provided by the server. The user may then be able to initiate and use any of the server-provided applications as they would if the applications were being run on the client's own computer. The applications executed by the server are represented on the client's computer by displaying bitmap images representing display renderings. The server performs periodic screen captures which provide a visual representation of the applications the client is running on the server. The server then transmits the representative bitmap images to the client computer, thus updating the client's computer with any changes to the applications running on the server.

Most applications run fairly smoothly on remote session applications. However, for some applications, the updated bitmap images are insufficient to convey all the changes that occurred between the periodic screen captures. Media players are one example of such an application.

Media players are capable of receiving media inputs such as audio files, audio streams, video files, and video streams, and outputting audio and/or visual signals representative of the media file or stream. In the case of video files or streams, media players display a series of images, along with the accompanying audio. If a media player application running on a remote server is playing a video, the media player will output multiple images per second; however, the remote server's periodic screen captures may occur at a substantially less frequent rate. The result on the client's computer is often a choppy and interrupted playback.

BRIEF SUMMARY

In one embodiment of the present invention, a first computer system is capable of performing a method whereby the first computer system may provide a continuous media data flow to a second computer system. The method involves the first computer system accessing media information that is to be presented at a second computer system. The first computer system formulates metadata representing the location and boundaries of a media application window. The first computer system formulates windows presentation information representative of the configuration of other interface elements that are to be presented along with the media information at the second computer system. The first computing system transmits the windows presentation information and the metadata to the second computer system. The first computing system separately transmits the media information to the second computer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to a method for providing a continuous media data flow between a plurality of computing systems. In one embodiment of the present invention, a first computer system is capable of performing a method whereby the first computer system may provide a continuous media data flow to a second computer system. The method involves the first computer system accessing media information that is to be presented at a second computer system. The first computer system formulates metadata representing the location and boundaries of a media application window. The first computer system formulates windows presentation information representative of the configuration of other interface elements that are to be presented along with the media information at the second computer system. The first computing system transmits the windows presentation information and the metadata to the second computer system. The first computing system separately transmits the media information to the second computer system. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
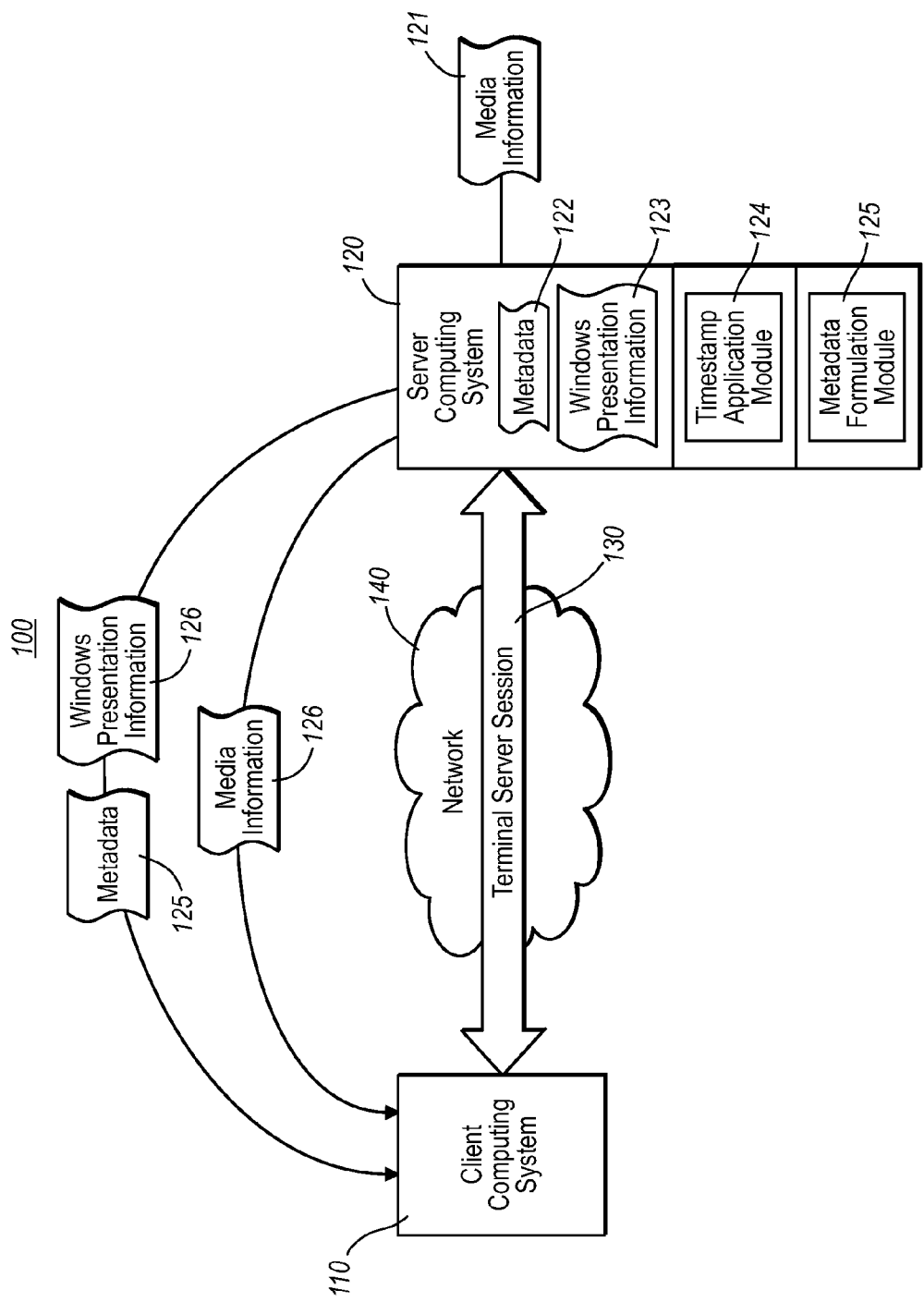
FIG. 1 illustrates a computing environment in which embodiments of the present invention may operate including providing a continuous media data flow between a plurality of computing systems.

FIG. 1 illustrates an environment 100 in which the principles of the present invention may be employed. The environment 100 includes a client computing system 110 and a server computing system 120 which are capable of communicating with each other over a computing network 140. In some embodiments, the client computing system 110 and the server computing system 120 are engaged in a terminal server session 130. In a terminal server session, the terminal server can transmit a bitmap image representative of the virtual display created on the terminal server. As a user on the client computing system interacts with software applications run on the terminal server, the terminal server can transmit updated bitmap images which represent changes in the presentation of windows on the terminal server. Software applications run on the server computing system 120 will be referred to herein as "remote applications." Software applications run on the client computing system 110 that do not require interaction with another computing system are referred to herein as "Local applications."

Many times, a user of a client computing system 110 will run applications that are capable of playing back media information 121. Media information can be a video file or video stream, audio file or audio stream, any type of animated content such as Macromedia™ Flash animations or any type of still content such as images. Media information may be referred to herein as "media files" with the understanding that media files may include file streams or any other type of media content. Applications capable of playing back media information will be referred to herein as "media players." Media players may be capable of playing back audio files, video files, images, or any combination of media files.

Figure 2:
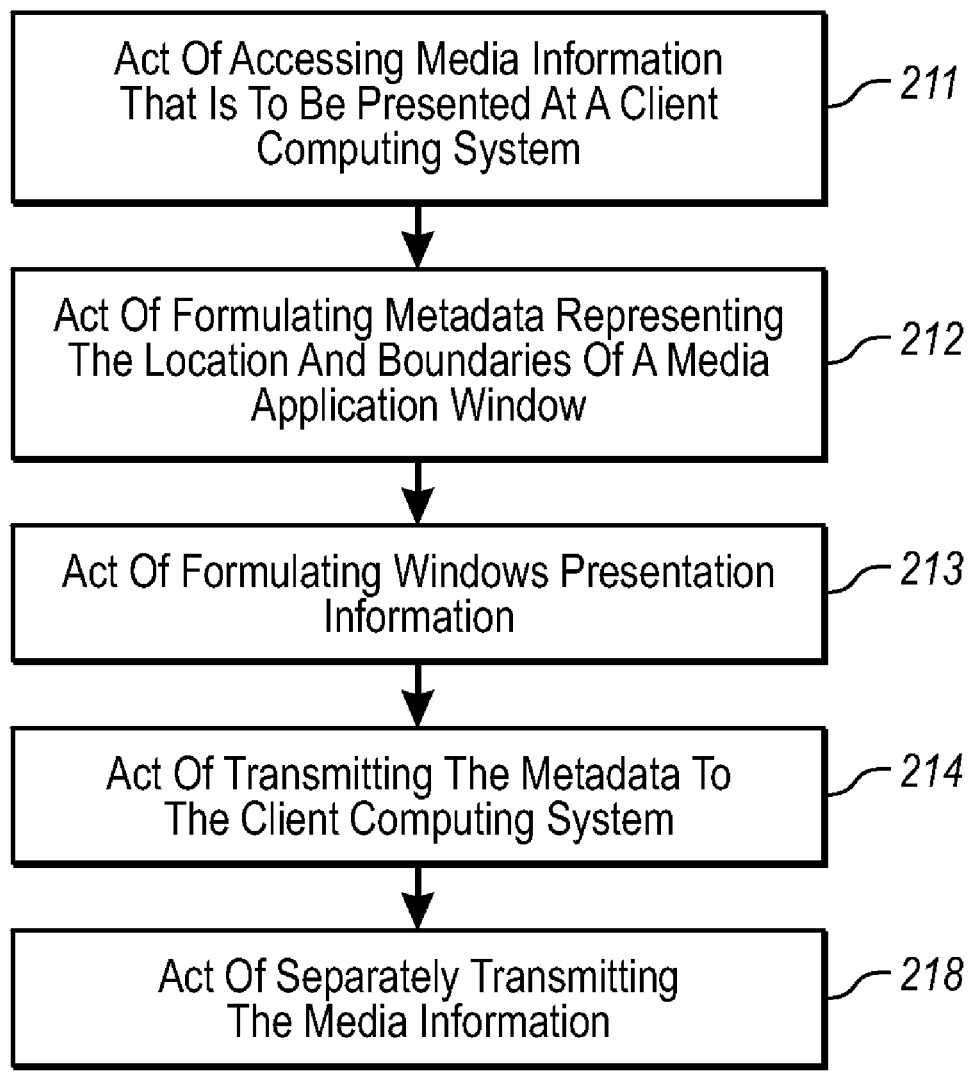
FIG. 2 illustrates a flowchart of a method for providing a continuous media data flow between a plurality of computing systems.

Often, when a media player is run on a server computing system 120 and the media player is playing a video file, the periodic bitmap images transferred from the server computing system 120 are insufficient to render continuous playback on the client computing system 110. In one embodiment, the method 200 of FIG. 2 illustrates a method for providing a continuous media data flow from the server computing system 120 to the client computing system 110. Data flow occurs when two computing systems are connected via a computing network 140 and data is being transferred between the computing systems (110 and 120). A continuous media data flow occurs when the server computing system 120 is able to transmit a continuous stream of data over the network 140 to the client computing system 110. In some embodiments, a continuous media data flow represents a sufficient amount data flowing to the client computing system 10 to allow the client computing system 110 to play back the media file at a satisfactorily continuous rate (i.e. the media playback does not appear choppy or interrupted).

FIG. 2 illustrates a flowchart of a method 200 for providing a continuous media data flow from the server computing system 120 to the client computing system 110. As the method 200 may be performed in the context of the environment 100 of FIG. 1, the method 200 of FIG. 2 will now be described with frequent reference to FIG. 1. Acts that are performed by the server computing system 120 are illustrated in FIG. 2 under the heading "Server Computing System—120".

The method 200 of FIG. 2 includes an act of accessing media information that is to be presented at a client computing system (act 211). For example, if a user opens a media player application remotely on a server computing system 120, the server computing system 120 may access the media information by requesting the media information from a remote source (e.g. a website) or by opening a media file stored on the server computing system 120.

The method 200 includes an act of formulating metadata representing the location and boundaries of a media application window configured to present the accessed media information at the second computer system and the format type of the media information (act 212). Metadata is information that can be used to describe one or more objects. For example, location and boundaries of a media application window may be stored in the metadata. Format type may also be stored in the metadata. Media format type indicates the method of formatting used on the media file. Media players often use media format type to determine how to decode and play back the media file.

In one embodiment, the server computing system, using a metadata formulation module 125, formulates metadata 122 in which the size of the media application window and the media format type are stored. In one example, the server computing system 120 may use a video mixer renderer (VMR) to determine the location and boundaries of the media application window. A VMR is a piece of software that is capable of interpreting an inputted media file and outputting a display to a media player. The VMR may be capable of detecting the size and/or boundaries of the outputted display and thus determine where on the screen the media player is displaying the media file.

Additionally or alternatively, driver-level heuristics may be used to determine the location and boundaries of the media application window. These heuristics may be capable of determining which portion of the screen is being used by the media player to play back the media file, based on the information sent by the server computing system 120 to its display driver. Driver-level heuristics may determine this information by analyzing and detecting which portions of the screen are rapidly changing (indicating that a media file is being played back) and which portions are remaining substantially unchanged.

Method 200 includes an act of formulating windows presentation information (act 213). Windows presentation information may include the number of application windows to present, the order in which the windows should be displayed (i.e. which window is on top, which is below, etc.), whether each window is maximized or minimized, and any other information useful in determining how to present the application windows. In one example, the windows presentation information 123 may be representative of the configuration of other interface elements that are to be presented along with the media information 121 at the second computer system. Other interface elements may include windows or application icons or any other element other than the media information which may be displayed on the client computing system 110. In some embodiments, some or all of the windows presentation information 123 may be contained in the metadata 122.

Method 200 includes an act of transmitting the windows presentation information to the second computing system 120 (act 214). In one example, the windows presentation information 123 is transmitted to aid the client computing system 110 in appropriately presenting the other interface elements.

Method 200 includes an act of transmitting the metadata to the client computing system (act 215). In one embodiment, the server computing system 120 transmits the metadata 122 formulated by the metadata formulation module 125 in addition to the windows presentation information. As explained above, the metadata is useful in determining the location, size, and format of the media information 121 being played back by a media player on the client computing system 110.

Method 200 also includes an act of separately transmitting the media information (act 218). In one embodiment, the server computing system 120 transmits the media information 121 over the network 140 to the client computing system 110 such that the media information 121 can be subject to further processing without affecting the windows presentation information 123. In one embodiment where the server computing system 120 is a terminal server, the server computing system 120 may transmit the media information 120 separately in order to conserve network bandwidth and to achieve a continuous data flow to the client computing system 110. Network bandwidth may more easily be conserved when the media information 121 is compressed.

In some embodiments of the present invention, the server computing system 120 may compress the media information 121 before transmitting it to the client computing system 110. Compressing the media information 121 decreases the size or quantity of media information. Thus, when the media information 121 is transmitted, it takes less time and network bandwidth.

In some embodiments of the present invention, the media information 121 may be compressed at a variable rate of compression. This is useful for transmission during periods of peak network traffic, both high and low. If network traffic is high and bandwidth is correspondingly low, the server computing system 120 may compress the media information 121 at a higher rate. Whereas if the network traffic is low and bandwidth is correspondingly high, the server computing system 120 may compress the media information 121 at a lower rate. In such a scenario the variable rate of compression is based on network state information. Network state information may include parameters such as current level of network traffic, available bandwidth, routing path, and/or physical distance between nodes.

In some embodiments, where the server computing system 120 has compressed the media information 121, the compressed media information 121 may be spooled until the network state information indicates that a substantially reliable connection exists. The compressed media information 121 may be spooled, or placed in a queue, until the network state information indicates that the compressed media information can be continuously transmitted. The media information 121 may be compressed in a variety of different methods using various techniques. For example, the server computing system 120 may compress the media information 121 using a code. Additionally or alternatively, the media information 121 may be compressed using Microsoft™ DirectShow. Also, the media information 121 may be compressed in real-time. For example, the server computing system 120 may be receiving media information 121, compressing it, and transmitting compressed media information 121 to the client computing system 110 simultaneously.

In some embodiments, the server computing system 120 may reformat the media information 121 to a different format type to facilitate playback on media players incapable of representing the media information in its original format. Format types include at least the following: Audio Video Interleave (AVI), Windows Media Video (WMV), Windows Media Audio (WMA), Moving Picture Experts Group 1 (MPEG-1), MPEG-2, MPEG-3, MPEG-4, Apple™ Quicktime, Macromedia™ Flash, RealNetworks™ RealMedia, RealVideo, and RealAudio, Ogg Vorbis and Theora, and Google™ Video.

Figure 3:
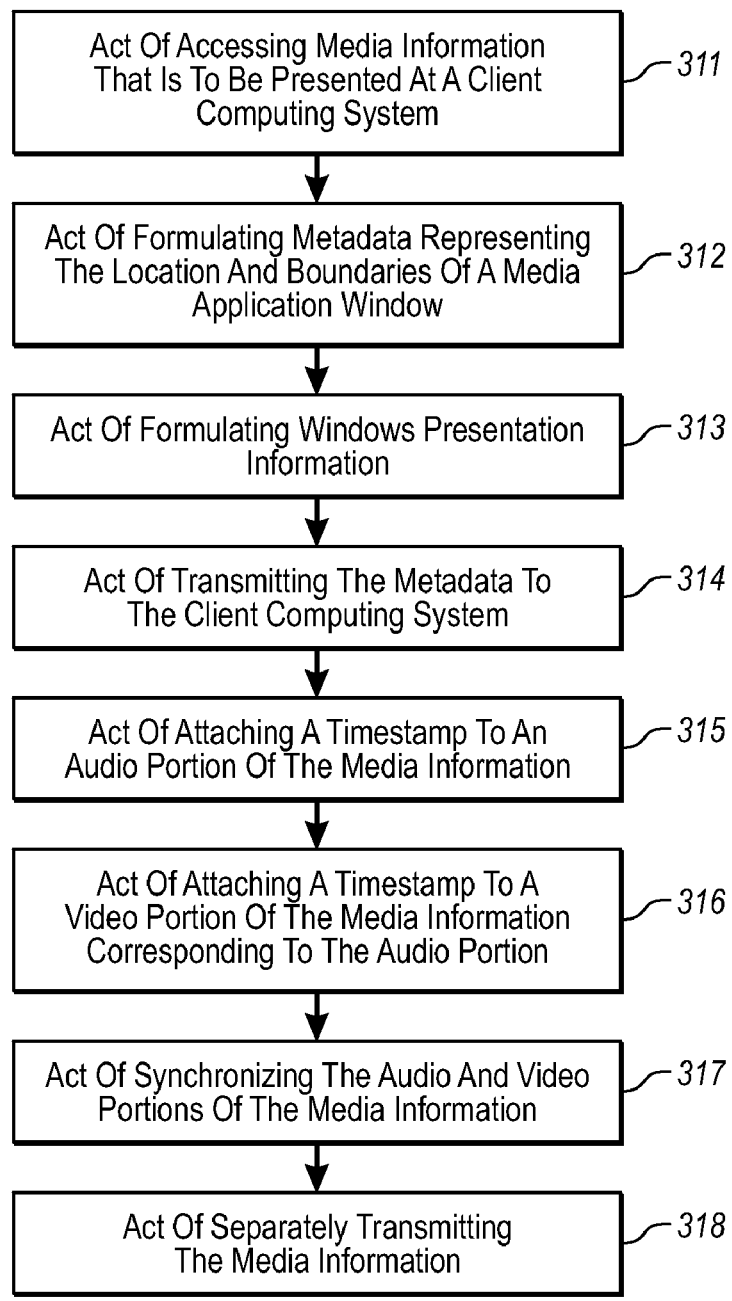
FIG. 3 illustrates a flowchart of an embodiment of a method for providing continuous data flow between a plurality of computing systems.

FIG. 3 illustrates a method 300 for providing a continuous media data flow from the server computing system 120 to the client computing system 110. Acts 311, 312, 313, 314, 315, and 319 are substantially similar and correspond to acts 211, 212, 213, 214, 215, and 219. Thus, although acts 311, 312, 313, 314, 315, and 319 are part of Method 300, they will not be described separately below. In addition to acts 311, 312, 313, 314, 315, and 319, method 300 includes an act of attaching a timestamp to an audio portion of the media information 121 (act 316). A timestamp is a means of tracking the elapsed time of a media file. For example, if a media file has a length of three minutes (3:00), a timestamp would allow a user or application to jump to any portion of the media file and begin playback at that point in time on the media file.

In one embodiment, the server computing system 120 may attach a timestamp to an audio portion of a media file. The timestamp may be attached at the beginning of the media file so it can be used to sequence another portion of a media file with the audio portion.

Method 300 also includes an act of attaching a timestamp to a video portion of the media information corresponding to the audio portion (act 317). For example, the server computing system 120 may attach a timestamp to a video portion of the media file that already contains a timestamp on the audio portion.

Method 300 includes an act of synchronizing the audio and video portions of the media information (act 318). For example, the server computing system 120, using the timestamp on the audio portion of the media file, may synchronize the audio and video portions by directing the media player to playback the video portion starting from the audio timestamp. Thus, methods 200 and 300 illustrate a method for providing a continuous media data flow from the server computing system 120 to the client computing system 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more computer storage devices having stored thereon computer-executable instructions that, when executed by one or more processors of a computer system, cause the computer system to perform a method for a first computer system to provide a continuous media data flow to a second computer system, the method comprising:

an act of the first computer system accessing a video file that is to be presented at a second computer system that is connected to a common network with the first computer system while the first and second computer systems are engaged in a terminal server session;

an act of the first computer system rendering the video file within a local media application window at the first computer system, which causes a first portion of a display screen displaying the rendered video file to change more rapidly than one or more other portions of the display screen that remain relatively unchanged;

an act of the first computer system detecting a location and boundaries of the local media application window used to render the video file at the first computer system by detecting the location and boundaries of the first portion of the display screen that is displaying the rendered video file and that is changing more rapidly than the one or more other portions of the display screen that remain relatively unchanged;

an act of the first computer system reformatting the video file to generate corresponding media information to send to the second computer system;

an act of the first computer system formulating metadata representing (i) the location and boundaries of local media application window used to render the video file, which is used by the second computer system to determine where to render corresponding media information at a display at the second computer system when the corresponding media information is received at the second computer system; and (ii) a format type of the corresponding media information;

an act of the first computer system also formulating windows presentation information, which is different than the location and boundaries represented by the metadata, and which is representative of one or more interface elements of the local media application window, the windows presentation information used by the second computer system to generate a corresponding media application window at the display at the second computer system in which the second computer system renders the corresponding media information when the corresponding media information is received;

an act of the first computer system transmitting the windows presentation information to the second computer system, such that the second computer system can appropriately generate the corresponding media application window at the display at the second computer system;

an act of the first computer system transmitting the metadata to the second computer system to inform the second computer system of (i) the location and boundaries of the rendered video file, and (ii) the corresponding media information format type, such that the second computer system can appropriately determine where to render the corresponding media information at the display at the second computer system; and an act of the first computer system transmitting the corresponding media information over the network to the second computer system separately from the windows presentation information such that the corresponding media information can be subject to further processing without affecting the windows presentation information.

2. The one or more computer storage devices according to claim 1, wherein rendering the video file within the local media application window at the first computer system comprises using a video mixer renderer (VMR) to render the video file within the local media application window.

3. The one or more computer storage devices according to claim 1, wherein detecting the location and boundaries of the local media application window used to render the video file comprises using driver-level heuristics to determine the location and boundaries of the rendered video file within the local media application window.

4. The one or more computer storage devices according to claim 1, wherein reformatting the video file to generate corresponding media information comprises the first computer system compressing the video file in order to improve transferability over the common network connection.

5. The one or more computer storage devices according to claim 4, wherein the video file is compressed at a variable rate of compression.

6. The one or more computer storage devices according to claim 5, wherein the variable rate of compression is based on network state information.

7. The one or more computer storage devices according to claim 6, wherein the network state information comprises parameters including current level of network traffic, available bandwidth, routing path, and physical distance between nodes.

8. The one or more computer storage devices according to claim 6, wherein the compressed video file is spooled until the network state information indicates that a substantially reliable connection exists such that the compressed video file can be continuously transmitted.

9. The one or more computer storage devices according to claim 4, wherein the video file is compressed using a code.

10. The one or more computer storage devices according to claim 4, wherein the video file is compressed in real-time.

11. The one or more computer storage devices according to claim 4, wherein the video file is compressed using Direct-Show.

12. The one or more computer storage devices according to claim 1, wherein reformatting the video file to generate the corresponding media information comprises the first computer system reformatting the video file to a different format type to facilitate playback on the second computer system when the second computer system is incapable of rendering the video file in its original format.

13. The one or more computer storage devices according to claim 12, wherein the format type includes at least one of the following: Audio Video Interleave (AVI), Windows Media Video (WMV), Windows Media Audio (WMA), Moving Picture Experts Group 1 (MPEG-1), MPEG-2, MPEG-3, MPEG-4, Apple™ Quicktime, Macromedia™ Flash, RealNetworks™ RealMedia, RealVideo, and RealAudio, Ogg Vorbis and Theora, or Google™ Video.

14. The one or more computer storage devices according to claim 1, further comprising:

an act of the first computer system attaching a timestamp to an audio portion of the corresponding media information that is to be transmitted to the second computer system;

an act of the first computer system attaching a timestamp to a video portion corresponding to the time stamp of the audio portion of the corresponding media information;

an act of synchronizing the audio and video portions of the corresponding media information by arranging the audio and video portions according to the timestamp of the audio portion; and an act of transmitting the synchronized audio and video portions of the corresponding media information over the network to the second computer system separately from the windows presentation information.

15. In a computing environment, a method for a first computer system to provide a continuous media data flow to a second computer system, the method comprising:

an act of the first computer system accessing a video file that is to be presented at a second computer system that is connected to a common network with the first computer system while the first and second computer systems are engaged in a terminal server session;

an act of the first computer system rendering the video file within a local media application window at the first computer system, which causes a first portion of a display screen displaying the rendered video file to change more rapidly than one or more other portions of the display screen that remain relatively unchanged;

an act of the first computer system detecting a location and boundaries of the local media application window used to render the video file at the first computer system by detecting the location and boundaries of the first portion of the display screen that is displaying the rendered video file and that is changing more rapidly than the one or more other portions of the display screen that remain relatively unchanged;

an act of the first computer system formulating metadata representing (i) the location and boundaries of the local media application window used to render the video file, which is used by the second computer system to determine location and boundaries in which to render the video file at a display at the second computer system when the video file is received at the second computer system; and (ii) a format type of the video file;

an act of the first computer system also formulating windows presentation information that is different than the location and boundaries represented by the metadata and that is representative of one or more interface elements that are to be presented along with the video file as part of a corresponding media application window at the display at the second computer system, the corresponding media application window mirroring the one or more interface elements as displayed in the local media application window;

an act of the first computer system transmitting the windows presentation information to the second computer system, such that the second computer system can appropriately generate the corresponding media application window;

an act of the first computer system transmitting the metadata to the second computer system to inform the second computer system of (i) the location and boundaries of the rendered video file, and (ii) the video file format type, such that the second computer system can appropriately determine where to render the received video file within the corresponding media application window at the display at the second computer system; and an act of the first computer system transmitting the video file over the network to the second computer system separately from the windows presentation information such that the video file can be subject to further processing without affecting the windows presentation information.

16. The method of claim 15, further comprising an act of the first computer system compressing the video file prior to transmitting the video file over the network in order to improve transferability over the common network connection.

17. The one or more computer storage devices according to claim 1, wherein the second computer system uses the terminal server session to gain access to one or more applications provided by the first computer system, including the media application.

18. The one or more computer storage devices according to claim 1, wherein the windows presentation information includes at least one of: a number of application windows to present, an order in which one or more application windows should be displayed, or whether each application window is maximized or minimized.

19. The one or more computer storage devices according to claim 1, wherein the one or more interface elements of the local media application window include at least one of a window icon or an application icon.

20. The one or more computer storage devices according to claim 1, wherein the second computing system uses the windows presentation information, the metadata, and the corresponding media information to render the corresponding media information within in the corresponding media window at the display at the second computing system and that adheres to the location and boundary information and the windows presentation information, rather than displaying bitmap images received through the terminal server session that represent periodic screen captures of the rendered media information as rendered by the first computing system.

21. The one or more computer storage devices according to claim 1, wherein said accessing the video file that is to be presented at the second computer system includes the second computer system initiating the launching of the local media player application at the first computer system through the terminal server session.

22. The one or more computer storage devices according to claim 1, wherein transmitting the windows presentation information to the second computer system includes transmitting the windows presentation information through the terminal server session.

23. The one or more computer storage devices according to claim 1, wherein transmitting the metadata to the second computer system includes transmitting the metadata through the terminal server session.

24. A server computer system, comprising:
one or more processors; and
one or more computer storage devices having stored thereon computer executable instructions that, when executed by the one or more processors, implement a method, comprising:
an act of the server computer system accessing media information comprising a video file, that is to be presented at a client computer system that is connected to a common network with the server computer system while the server and client computer systems are engaged in a terminal server session;
an act of the server computer system rendering the video file within a local media application window at the server computer system, which causes a portion of a display screen displaying the rendered video file to change more rapidly than one or more other portions of the display screen that remain relatively unchanged;
an act of the server computer system detecting a location and boundaries of the local media application window used to render the video file at the server computer system by detecting the location and boundaries of the portion of the display screen that is displaying the rendered video file and that is changing more rapidly than the one or more other portions of the display information at the server computer system that remain relatively unchanged;
an act of the server computer system formulating metadata representing (i) the location and boundaries of the local media application window used to render the video file, which is used by the client computer system to determine where to render the video file when at a display at the client computer system when the video file is received configured to present the accessed media information at the client computer system; and (ii) a format type of the video file;

an act of the server computer system formulating windows presentation information: which is different than the location and boundaries represented by the metadata and which is representative of one or more interface elements of the local application window, the windows presentation information used by the client computer system to generate a corresponding media application window at the display at the client computer system in which the client computer system renders the video file when the video file is received;

an act of the server computer system transmitting the windows presentation information to the client computer system such that the client computer system can appropriately generate the corresponding media application window at the display at the client computer system;

an act of the server computer system transmitting the metadata to the client computer system to inform the client computer system of (i) the location and boundaries of the rendered video file and (ii) the video file format type, such that the client computer system can appropriately determine where to render the video file at the display at the client computer system; and an act of the server computer system transmitting the video file over the network to the client computer system separately from the windows presentation information such that the video file can be subject to further processing without affecting the windows presentation information.

* * * * *